United States Patent
Heins (10) Patent No.: US 7,077,201 B2
(45) Date of Patent: *Jul. 18, 2006

(54) WATER TREATMENT METHOD FOR HEAVY OIL PRODUCTION

(75) Inventor: William F. Heins, Redmond, WA (US)

(73) Assignee: GE Ionics, Inc., Watertown, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/307,250

(22) Filed: Nov. 30, 2002

(65) Prior Publication Data

US 2003/0127226 A1 Jul. 10, 2003

Related U.S. Application Data

(63) Continuation-in-part of application No. 09/566,622, filed on May 8, 2000, now Pat. No. 6,733,636.

(60) Provisional application No. 60/133,172, filed on May 7, 1999.

(51) Int. Cl.
- E21B 43/24 (2006.01)
- E21B 43/40 (2006.01)
- B01B 1/28 (2006.01)
- C02F 1/04 (2006.01)
- C02F 9/00 (2006.01)

(52) U.S. Cl. ............ 166/266; 159/24.1; 159/45; 159/47.1; 159/901; 166/267; 166/272.3; 166/303; 203/10; 203/26; 203/48; 203/98; 203/DIG. 16; 210/664; 210/669; 210/747; 210/805; 210/806; 405/129.35; 588/250

(58) Field of Classification Search ............ 166/75.15, 166/266, 267, 272.3, 272.6, 272.7, 302, 303; 159/24.1, 45, 47.1, 901; 203/10, 26, 48, 203/98, DIG. 16; 210/664, 669, 747, 805, 210/806; 405/129.35; 588/250

See application file for complete search history.

(56) References Cited

U.S. PATENT DOCUMENTS 2,091,898 A 8/1937 Weber (Continued)

FOREIGN PATENT DOCUMENTS

CA 2274258 7/1998

(Continued)

OTHER PUBLICATIONS

S.Kok, A. Saidi, and R. Solomon, "Total dissolved Solids Removal From Water Produced During The In Situ Recovery of Heavy Oil and Bitumen", Advances in Thermal Recovery, The Journal of Canadian Petroleum Technology, vol. 26, No. 1, pp. 100-105, Jan. 1989.

(Continued)

Primary Examiner—George Suchfield
(74) Attorney, Agent, or Firm—R. Reams Goodloe, Jr.

(57) ABSTRACT

An evaporation based method of treating produced water from heavy oil production. A produced water from heavy oil recovery operations treated by first removing oil and grease to a desired level, preferably to about twenty parts per million, or less. If necessary, the pH is then adjusted, normally downward and by acid addition, to release at least some carbonate alkalinity as free carbon dioxide. Preferably, all non-hydroxide alkalinity is removed, or substantially so, by introducing the feedwater into a decarbonator. Feedwater is introduced into an evaporator, and the feedwater is evaporated to a selected concentration factor to produce (1) a distillate having a small amount of residual solutes, and (2) evaporator blowdown containing residual solids. Distillate may be directly used for steam generation in a once-through steam generator, or polished by ion exchange or electrodeionization prior to feed to a packaged boiler. In either case, 100% quality steam is produced, directly in indirectly, for downhole use.

32 Claims, 7 Drawing Sheets

U.S. PATENT DOCUMENTS

| | | | |
|---|---|---|---|
| 3,192,130 A | 6/1965 | Pottharst, Jr. | |
| 3,586,090 A | 6/1971 | Henderson | |
| 3,917,526 A | 11/1975 | Jennings | |
| 3,933,576 A | 1/1976 | Rushton | |
| 3,968,002 A | 7/1976 | Standiford | |
| 4,030,985 A | 6/1977 | Barba et al. | |
| 4,054,493 A | 10/1977 | Roller | |
| 4,073,644 A | 2/1978 | Papafingos et al. | |
| 4,083,781 A | 4/1978 | Conger | |
| 4,090,916 A | 5/1978 | Papafingos et al. | |
| 4,105,556 A | 8/1978 | D'Amaddio et al. | |
| 4,260,461 A | 4/1981 | Pottharst | |
| 4,343,691 A | 8/1982 | Minkkinen | |
| 4,344,826 A | 8/1982 | Smith | |
| 4,370,858 A | 2/1983 | Awerbuch et al. | |
| 4,391,102 A | 7/1983 | Studhalter et al. | |
| 4,392,959 A | 7/1983 | Coillet | |
| 4,398,603 A | 8/1983 | Rodwell | |
| 4,444,680 A | 4/1984 | Kitzes et al. | |
| 4,458,520 A | 7/1984 | Adame et al. | |
| 4,472,355 A | 9/1984 | Hickam et al. | |
| 4,474,011 A | 10/1984 | Nelson et al. | |
| 4,498,542 A * | 2/1985 | Eisenhawer et al. | 166/303 |
| 4,548,257 A | 10/1985 | Williamson | |
| 4,561,965 A | 12/1985 | Minkkinen | |
| 4,576,627 A | 3/1986 | Hughes | |
| 4,698,136 A | 10/1987 | El-Allawy | |
| 4,706,749 A | 11/1987 | Hayes et al. | |
| 4,877,536 A | 10/1989 | Bertness et al. | |
| 4,913,236 A | 4/1990 | Reed | |
| 4,967,837 A | 11/1990 | Danzik | |
| 4,969,520 A * | 11/1990 | Jan et al. | 166/266 |
| 5,250,151 A | 10/1993 | Huercanos | |
| 5,474,653 A | 12/1995 | Bostjancic | |
| 5,587,054 A | 12/1996 | Keith | |
| 5,683,587 A | 11/1997 | Ferrara et al. | |
| 5,695,643 A | 12/1997 | Brandt et al. | |
| 5,783,084 A | 7/1998 | Suenkonis | |
| 5,858,177 A | 1/1999 | Morris | |
| 5,932,074 A | 8/1999 | Hoiss | |
| 5,968,312 A | 10/1999 | Sephton | |
| 6,016,868 A * | 1/2000 | Gregoli et al. | 166/261 |
| 6,074,549 A | 6/2000 | Bacon Cochrane et al. | |
| 6,186,232 B1 | 2/2001 | Isaacs et al. | |
| 6,205,289 B1 | 3/2001 | Kobro | |
| 6,289,988 B1 * | 9/2001 | Myers et al. | 166/267 |
| 6,355,145 B1 | 3/2002 | Kresnyak et al. | |
| 6,365,005 B1 | 4/2002 | Schleiffarth | |
| 6,375,803 B1 | 4/2002 | Razzaghi et al. | |
| 6,536,523 B1 | 3/2003 | Kresnyak et al. | |

FOREIGN PATENT DOCUMENTS

| | | |
|---|---|---|
| CA | 2274258 | 6/1999 |
| CA | 2305118 | 5/2000 |
| CA | 2345595 | 11/2001 |

OTHER PUBLICATIONS

R.L. Solomon, and K.E. Schooley, "Recycling Oil-field Produced Waters Using Evaporation Technology", American Filtration Society, National Fall Meeting, Oct. 29-30, 1990, Baton Rouge, Louisiana. (11 pages including tables and Figures).

News Release Transmitted by Canadian Corporate News For: Aqua Pure Ventures, Inc., Oct. 14, 1998, CCN Home Page site Map, Mar. 3, 1999, (2 pages).

The Aqua Pure System: Pure Water Recovery, (Web Page); http:/www.aqua-pure.com, Mar. 3, 1999, (5 pages).

A Unique Mechanical Vapour Recompression / Distillation Process for Purifying Water, R.F. (Bob) Becker; Steve Kresnyak; Colt Engineering Corporation, Calgary, Alberta, Canada, Mar. 3, 1999, (9 pages).

Achieving Zero Liquid Discharge in the Heavy Oil Recovery Industry. W. Heins, Oil Sands Process Water Workshop, May 8, 2001, Fort McMurray, Alberta.

Bridge Over Troubled Water, Simplifying Water Purification for Increasingly Thirsty Oilsands Extractors, Maurice Smith, (Web Page); www.ntm.nickles.com/New Technology Magazine, Jul./Aug. 2001 (pp. 37-39).

Produced Water Recycling At BF Resources—Petro Canada's Wolf Lake Plant. W. Zalewski; R. Averill; G. Arychuk, Mar. 14, 1991.

Achieving Zero Liquid Discharge in SAGD Heavy Oil Recovery, W. Heins and K. Schooley, Petroleum Society's Canadian International Petroleum Conference 2000; Calgary, Alberta, Jun. 11-13, 2002. (10 pages).

Achieving Zero Liquid Discharge in SAGD Heavy Oil Recovery, W. Heins and K. Schooley, Petroleum Society's Canadian International Petroleum Conference 2002; Calgary, Alberta, Jun. 11-13, 2002. (10 pages).

* cited by examiner

FIG. 6A
TYPICAL FEEDWATER REQUIREMENTS
Packaged

| Constituent | Boilers | Units |
|---|---|---|
| Hardness | < 0.05 mg/l | as CaCO3 |
| Non-volatile TOC | < 0.20 mg/l | as C |
| Oil & Grease | < 0.20 mg/l | as substance |
| pH | 8.8 to 9.6 | pH |

FIG. 6B
TYPICAL FEEDWATER REQUIREMENTS
Once-Thru

| Constituent | Steam Generators | Units |
|---|---|---|
| Hardness | < 1.0 mg/L | as $CaCO_3$ |
| Non-volatile TOC | Reasonable | as C |
| Oil & Grease | < 0.5 mg/L | as substance |
| pH | 7.5 to 9.0 | pH |
| TDS | < 12,000 mg/L | as $CaCO_3$ equivalent |
| $O_2$ | negligible | as $O_2$ as |
| Fe | <0.25 mg/L | as Fe |
| $SiO_2$ | <100mg/L | as $SiO_2$ |

FIG. 5

FIG. 7
SILICA SOLUBILITY CHARACTERISTICS

FIG. 8
SEEDED-SLURRY SCALE PREVENTION MECHANISM

WATER TREATMENT METHOD FOR HEAVY OIL PRODUCTION

RELATED PATENT APPLICATIONS

This invention is a continuation-in-part of prior U.S. patent application Ser. No. 09/566,622, filed May 8, 2000, entitled WATER TREATMENT METHOD FOR HEAVY OIL PRODUCTION, which claimed priority from prior U.S. Provisional Patent Application Ser. No. 60/133,172, filed on May 7, 1999, the disclosures of which are incorporated herein in their entirety by this reference, including the specification, drawing, and claims of each application.

TECHNICAL FIELD

The invention disclosed and claimed herein relates to treatment of water to be used for steam generation in operations which utilize steam to recover oil from geological formations. More specifically, this invention relates to techniques for the preparation of high quality water for steam generators whose steam product is subjected to down-hole use in heavy oil recovery operations.

BACKGROUND

Water treatment is necessary in heavy oil recovery operations. This is because in order to recover heavy oil from certain geologic formations, steam is required to increase the mobility of the sought after oil within the formation. In prior art systems, oil producers have often utilized once-through type steam generators ("OTSG's"). Such steam generators are most commonly provided in a configuration and with process parameters so that steam is generated from a feedwater in a single-pass operation through boiler tubes heated by gas or oil burners. As noted in FIG. 1, which depicts the process flow sheet of a typical prior art water treatment system 10, such a once through steam generator 12 provides a low quality or wet steam, wherein about eighty percent (80%) quality steam is produced at about 1000 pounds per square inch (psig), or up to as much as 1800 psig. The 80% quality steam 14 (which is 80% vapor, 20% liquid, by weight percent) is injected via steam injection wells 16 to fluidize as indicated by reference arrows 18, along or in combination with other injectants, the heavy oil formation 20, such as oils in tar sands formations. Steam 14 eventually condenses and an oil/water mixture 22 results that migrates through the formation 20 as indicated by reference arrows 24. The oil/water mixture 22 is gathered as indicated by reference arrows 26 by oil/water gathering wells 30 and is pumped to the surface. Then, the sought-after oil is sent to an oil/water separator 32 in which the oil product 34 separated from the water 35 and recovered for sale. The produced water stream 36, after separation from the oil, is further de-oiled in a de-oiling process step 40, normally by addition of a de-oiling polymer 42, which de-oiling process usually results in waste oil/solids sludge 44. The de-oiled produced water stream 46 is then further treated for reuse. The water treatment plant schemes which have heretofore been provided for the produced water stream 46, i.e., downstream of the de-oiling unit 40 and upstream of injection well 16 inlet 48, and the type of boilers which are necessary or desirable as a consequence thereof, is the focus the important improvements described in this disclosure.

Figure 6A:
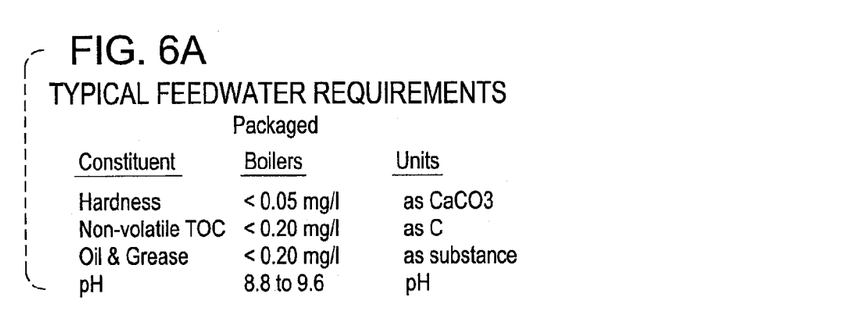
FIG. 6A shows the typical feedwater quality requirements for steam generators which produce steam in the 1000 pounds per square inch gauge range, or thereabouts, for packaged boiler type installations.
Figure 6B:
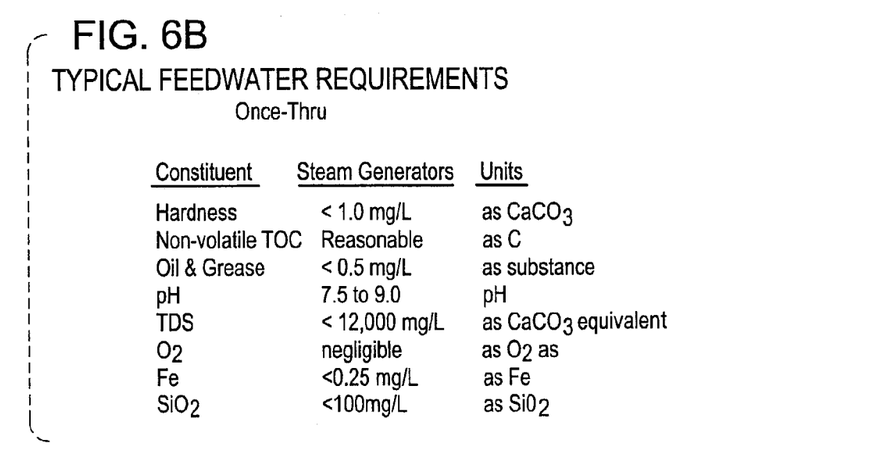
FIG. 6B shows the typical feedwater quality requirements for steam generators which produce steam in the 1000 pounds per square inch gauge range, or thereabouts, for once-through type steam generator installations.

Most commonly in prior art plants such as plant $10_1$, the water is sent to the "once-through" steam generators 12 for creation of more steam 14 for oil recovery operations. When used in once through steam generators 12, the treated produced water stream 12F, at time of feed to the steam generator 12, is typically required to have less than about 8000 parts per million ("PPM") of total dissolved solids ("TDS"), and, less frequently, may have up to about 12000 parts per million (as CaCO3 equivalent) of total dissolved solids, as noted in FIG. 6B. Often, it is necessary to meet other specific parameters before the water can be reused in such once-through steam generators 12.

Figure 1:
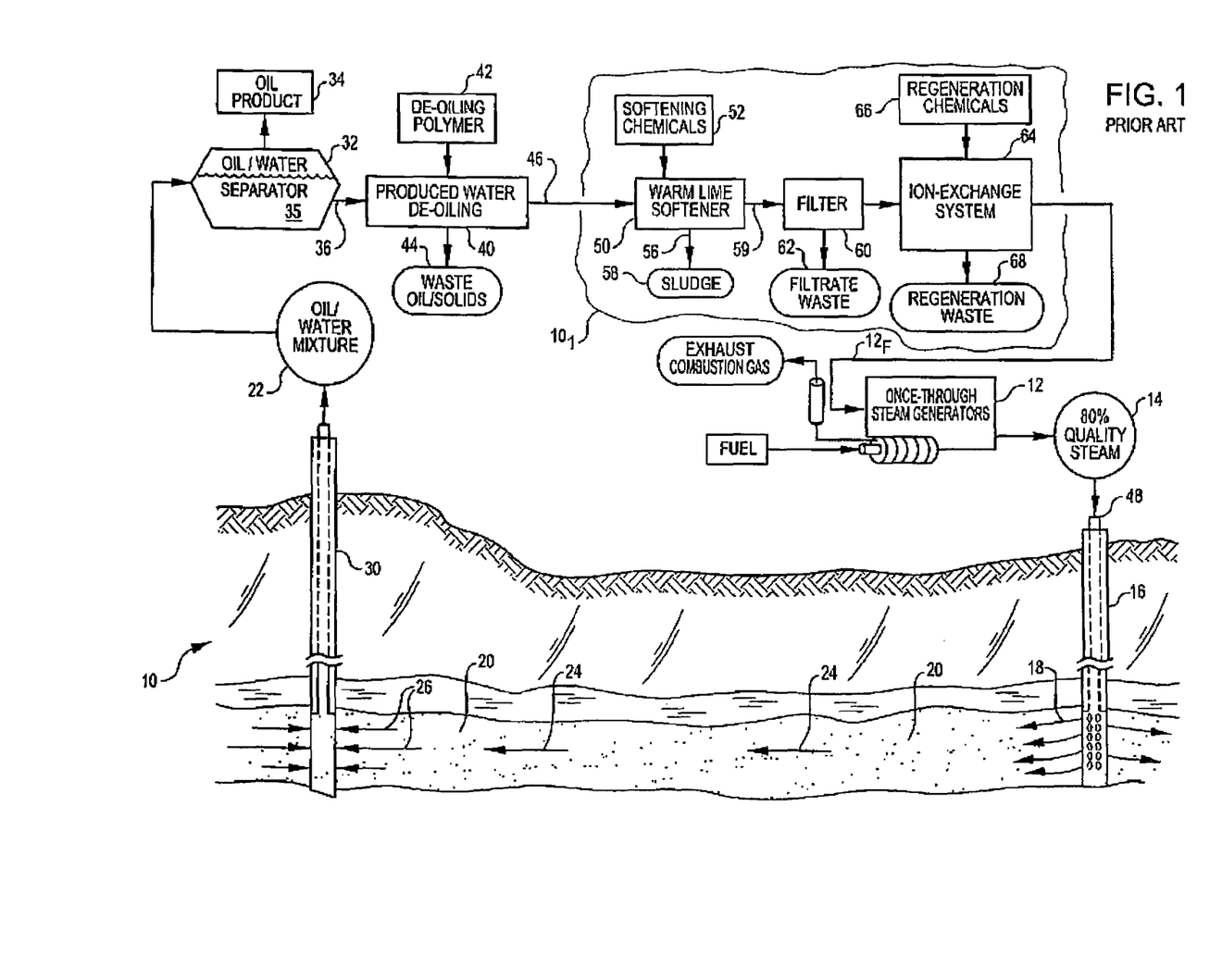
FIG. 1 shows a prior art process, namely a generalized process flow diagram for one typical physical-chemical water treatment process in heavy oil recovery operations.

In most cases, the de-ailed recovered water 46 must be treated in a costly water treatment plant sub-system $10_1$ before it can be sent to the steam generators 12. Treatment of Water before feed to the once-through steam generators 12 is often initially accomplished by using a warm lime softener 50, which removes hardness, and which removes some silica from the de-oiled produced water feedstream 46. Various softening chemicals 52 are usually necessary, such as lime, flocculating polymer, and perhaps soda ash. The softener 50 underflow 56 produces a waste sludge 58 which must be further handled and disposed. Then, an "after-filter" 60 is often utilized on the clarate stream 59 from the softener clarifier 50, to prevent carry-over from the softener 50 of any precipitate or other suspended solids, which substances are thus accumulated in a filtrate waste stream 62. For polishing, an ion exchange step 64, normally including a hardness removal step such as a weak acid cation (WAC) ion-exchange system that can be utilized to simultaneously remove hardness and the alkalinity associated with the hardness, is utilized. The ion exchange systems 64 require regeneration chemicals 66 as well understood by those of ordinary skill in the art and to which this disclosure is directed. However, regeneration of the ion-exchange system 64 results in the creation of a regeneration waste stream 68. Overall, such water treatment plants are relatively simple, but, result in a multitude of waste streams that must be further handled, at additional expense.

Figure 2:
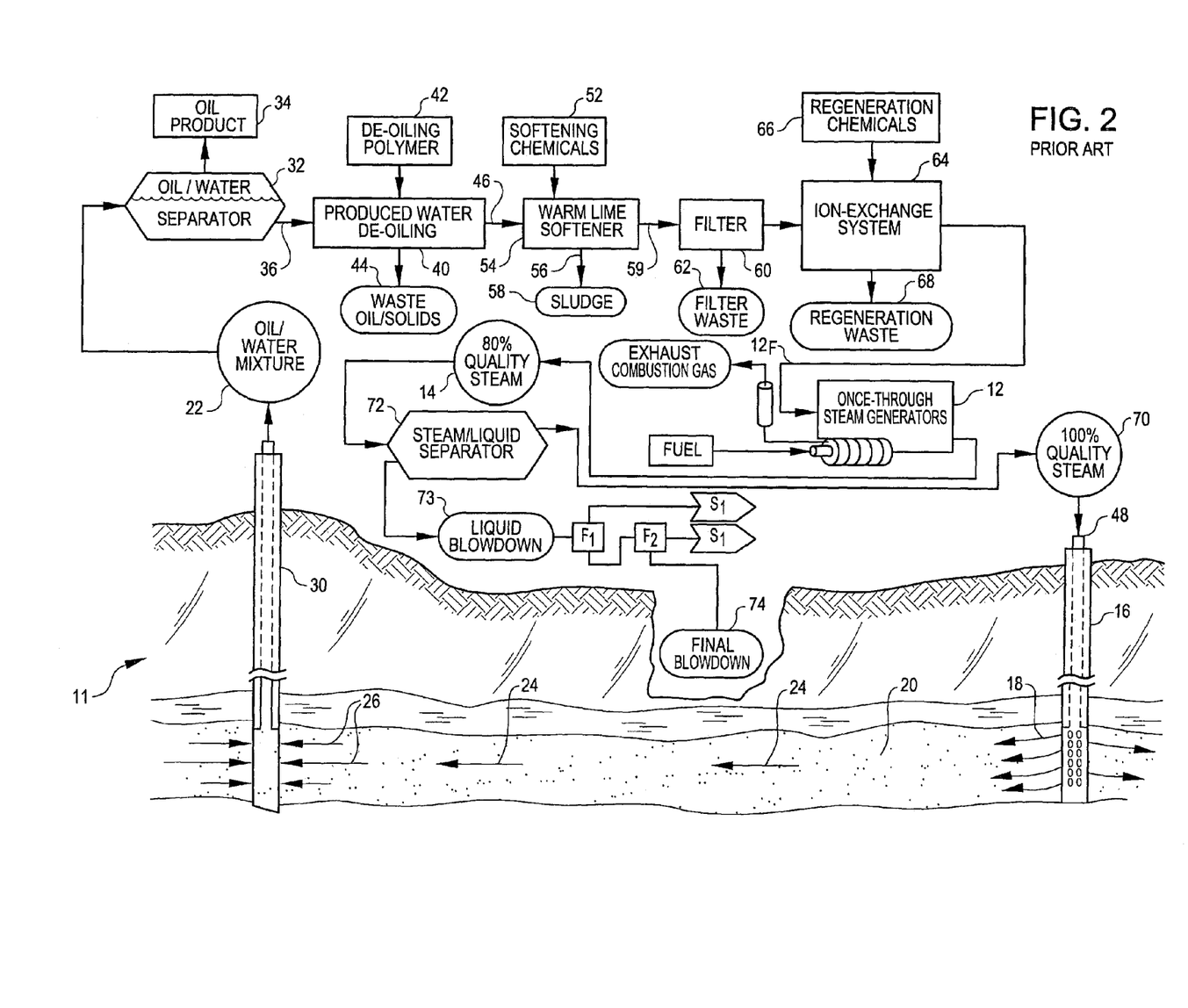
FIG. 2 shows a prior art process, namely a generalized process flow diagram for an industry state-of-the-art water treatment process in steam assisted gravity drainage (SAGD) type heavy oil operations.

In one relatively new heavy oil recovery process, known as the steam assisted gravity drainage heavy oil recovery process (the "SAGD" process), it is preferred that one hundred percent (100%) quality steam be provided for injection into wells (i.e., no liquid water is to be provided with the steam to be injected into the formation). Such a typical prior art system 11 is depicted in FIG. 2. However, given conventional prior art water treatment techniques as just discussed in connection with FIG. 1, the 100% steam quality requirement presents a problem for the use of once through steam generators 12 in such a process. That is because in order to produce 100% quality steam 70 using a once-through type steam generator 12, a vapor-liquid separator 72 is required to separate the liquid water from the steam. Then, the liquid blowdown 73 recovered from the separator is typically flashed several times in a series of flash tanks F1, F2, etc. through FN (where N is a positive integer equal to the number of flash tanks) to successively recover as series of lower pressure steam flows S1, S2, etc. which may sometimes be utilized for other plant heating purposes. After the last flashing stage FN, a residual hot water final blowdown stream 74 must then be handled, by recycle and/or disposal. The 100% quality steam is then sent down the injection well 16 and injected into the desired formation 20.

Figure 3:
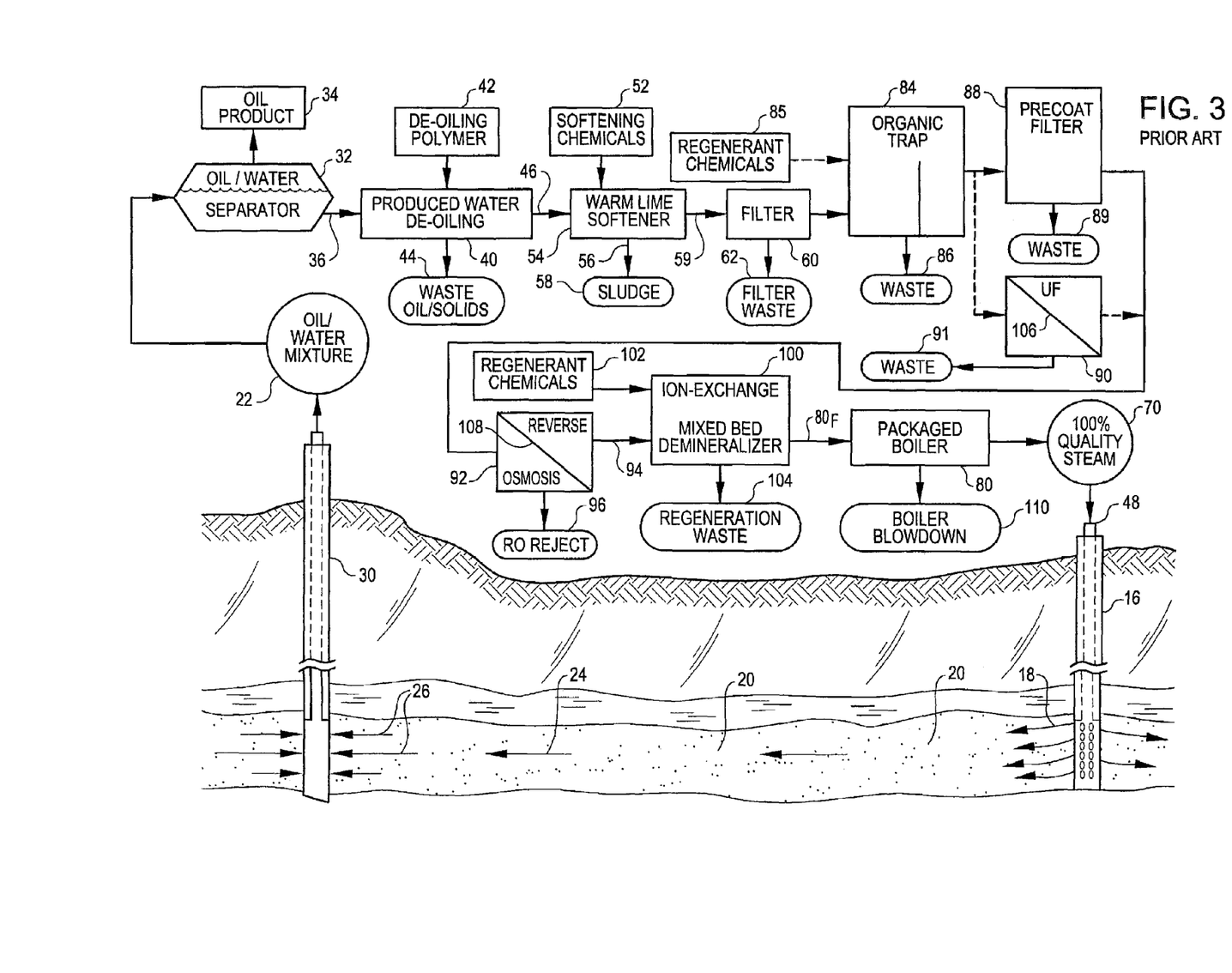
FIG. 3 shows a prior art physical-chemical treatment process scheme, as it might be applied for use in steam assisted gravity drainage (SAGD) type heavy oil recovery operations.

As depicted in FIG. 3, another method which has been proposed for generating the required 100% quality steam for use in the steam assisted gravity drainage process involves the use of packaged boilers 80. Various methods are known for producing water of sufficient quality to be utilized as feedwater 80F to a packaged boiler. One method which has been developed for use in heavy oil recovery operations involves de-oiling 40 of the produced water 36, followed by a series of physical-chemical treatment steps. Such treatment steps normally include a series of unit operations as softener 50, followed by filtration 60 for removal of residual particulates, then an organic trap 84 (normally non-ionic ion exchange resin) for removal of residual organics. The organic trap 84 may require a regenerant chemical supply 85, and, in any case, produces a waste 86, such as a regenerant waste. Then, a pre-coat filter 88 can be used, which has a precoat filtrate waste 89. In one alternate embodiment, an ultrafiltration ("UF") unit 90 can be utilized, which unit produces a reject waste stream 91. Then, effluent from the UF unit 90 or precoat filter 88 can be sent to a reverse osmosis ("RO") system 92, which in addition to the desired permeate 94, produces a reject liquid stream 96 that must be appropriately handled. Permeate 94 from the RO system 92, can be sent to an ion exchange unit 100, typically but not necessarily a mixed bed demineralization unit, which of course requires regeneration chemicals 102 and which consequently produces a regeneration waste 104. And finally, the packaged boiler 80 produces a blowdown 110 which must be accommodated for reuse or disposal.

The prior art process designs, such as depicted in FIG. 3, for utilizing packaged boilers in heavy oil recovery operations can be expected to have a high initial capital cost. Also, such a series of unit process steps involves significant ongoing chemical costs. Moreover, there are many waste streams to discharge, involving a high sludge disposal cost. Further, where membrane systems such as ultrafiltration 90 or reverse osmosis 92 are utilized, relatively frequent replacement of membranes 106 or 108, respectively, may be expected, with accompanying on-going periodic replacement costs. Also, such a process scheme can be labor intensive to operate and to maintain.

In summary, the currently known and utilized methods for treating heavy oil field produced waters in order to generate high quality steam for down-hole are not entirely satisfactory because:

physical chemical treatment process schemes are usually quite extensive, are relatively difficult to maintain, and require significant operator attention;

they require many chemical additives which must be obtained at considerable expense, and many of which require special attention for safe handling;

they produce substantial quantities of undesirable sludges and other waste streams, the disposal of which is increasingly difficult, due to stringent environmental and regulatory requirements.

It is clear that the development of a simpler, more cost effective approach to produced water treatment would be desirable for heavy oil production operations. Thus, it can be appreciated that it would be advantageous to provide a new process which minimizes the production of undesirable waste streams, while minimizing the overall costs of owning and operating a heavy oil recovery plant.

SOME OBJECTS, ADVANTAGES, AND NOVEL FEATURES

A new water treatment process disclosed herein, and various embodiments thereof, can be applied to heavy oil production operations. Such embodiments are particularly advantageous in they minimize the generation of waste products, and are otherwise superior to water treatment processes heretofore used or proposed in the recovery of bitumen from tar sands or other heavy oil recovery operations.

From the foregoing, it will be apparent to the reader that one of the important and primary objectives resides in the provision of a novel process, including several variations thereof, for the treatment of produced waters, so that such waters can be re-used in producing steam for use in heavy oil recovery operations.

Another important objective is to simplify process plant flow sheets, i.e., minimize the number of unit processes required in a water treatment train, which importantly simplifies operations and improves quality control in the manufacture of high purity water for down-hole applications.

Other important but more specific objectives reside in the provision of various embodiments of an improved water treatment process for production of high purity water for down-hole use in heavy oil recovery, which:

in one embodiment, eliminates the requirement for separation of the high pressure steam to be utilized downhole from residual hot liquids;

eliminates the generation of softener sludges;

in conjunction with the just mentioned objective, minimizes the production of undesirable waste streams;

minimizes operation and maintenance labor requirements;

minimizes maintenance materiel requirements;

reduces the capital cost of water treatment equipment;

minimizes chemical additives and associated handling requirements.

Other important objectives, features, and additional advantages of the various embodiments of the novel process disclosed herein will become apparent to the reader from the foregoing and from the appended claims and the ensuing detailed description, as the discussion below proceeds in conjunction with examination of the accompanying drawing.

BRIEF DESCRIPTION OF THE DRAWING

In order to enable the reader to attain a more complete appreciation of the novel water treatment process disclosed and claimed herein, and the various embodiments thereof, and of the novel features and the advantages thereof over prior art processes, attention is directed to the following detailed description when considered in connection with the accompanying figures of the drawing, wherein:

The foregoing figures, being merely exemplary, contain various elements that may be present or omitted from actual process implementations depending upon the circumstances. An attempt has been made to draw the figures in a way that illustrates at least those elements that are significant for an understanding of the various embodiments and aspects of the invention. However, various other elements of the unique process methods, and the combination of apparatus for carrying out the methods, are also shown and briefly described to enable the reader to understand how various features, including optional or alternate features, may be utilized in order to provide an efficient, low cost process design which can be implemented in a desired throughput size and physical configuration for providing optimum water treatment plant design and operation.

DESCRIPTION

Figure 4:
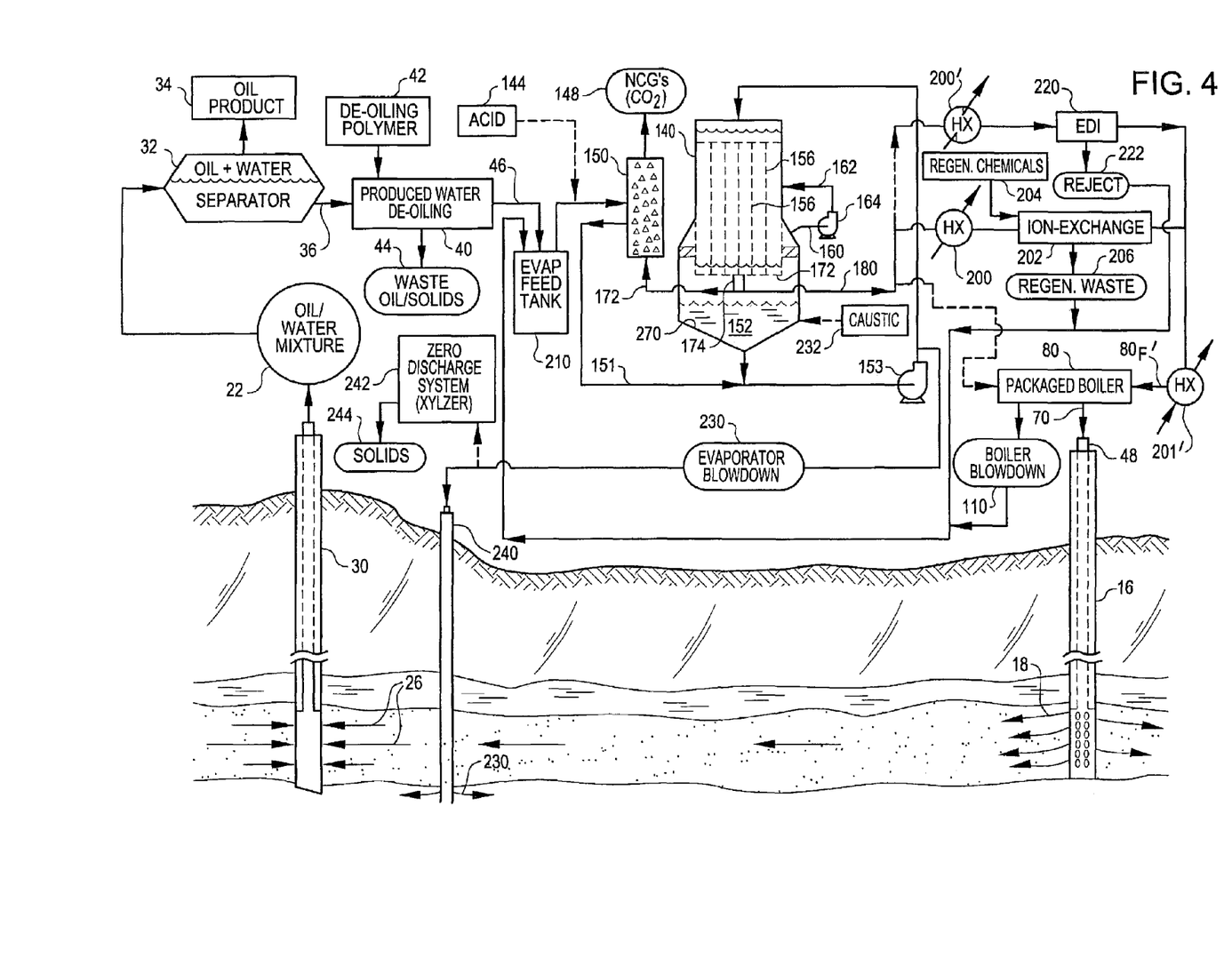
FIG. 4 shows one embodiment of the novel water treatment process disclosed and claimed herein, illustrating the use of the process in combination with the use of packaged boilers for steam production, as applied to heavy oil recovery operations.
Figure 4A:
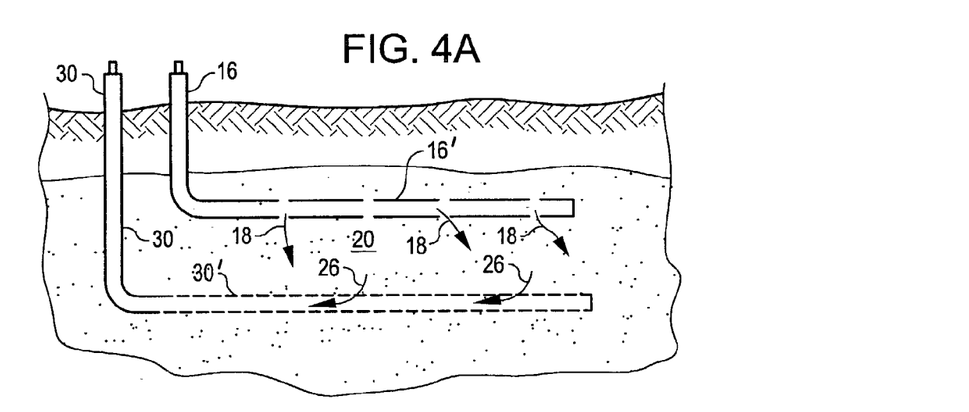
FIG. 4A shows one common variation of well orientation utilized in heavy oil recovery, namely the use of horizontal steam injection wells and of horizontal oil/water gathering wells, such as commonly encountered in a steam assisted gravity drainage heavy oil gathering project.

Since many steam assisted heavy oil recovery schemes, such as a steam assisted gravity drainage (SAGD) heavy oil recovery process depicted in FIG. 4A, most efficiently utilize a 100% quality steam 70, it would be desirable to produce such steam by an efficient process scheme such as the novel evaporation based heavy oil produced water treatment method depicted in FIG. 4. In the SAGD process horizontal injection wells 30' and horizontal oil/water gathering wells 10' are advantageously utilized spaced apart within an oil bearing formation 20. To produce high quality steam for use in heavy oil gathering, and especially in such production schemes just noted with reference to FIG. 4A, an evaporation based water treatment system 120 has been developed. This process, basically situated in one embodiment, process wise, between the de-oiled stream 46 and the injection well 16 head 48, and in combination with the steam injection well 16, oil recovery well 30, and related oil water separation equipment 32 and de-oiling equipment 40, and packaged boilers 80 as shown in FIG. 4 (or alternately, once through steam generators 12 in the process depicted in FIG. 5), can substantially reduce capital costs and can minimize ongoing operation and maintenance costs of heavy oil recovery. In some locales, such as northern Canada, the elimination of handling of waste sludges and waste streams made possible by the evaporation based water treatment system 120 may be especially important, since it may be difficult to work such waste materials during the extremely cold winter months.

It has been observed that it may be desirable in some instances to use a standard packaged boiler 80 to produce the required steam 70, rather than to utilize a traditional once-through type steam generator 12 to produce 80% quality steam 14 and then utilize separator 130 to separate steam 132 and liquid 134. It is noteworthy in such an evaluation that packaged boilers 80 are often less expensive on a capital cost basis and on an operating cost basis than once-through type oil-field steam generators 12. Also, package boilers are commonly utilized to produce pure steam 70, and thus produce only a minimal liquid blowdown stream 110. Unfortunately, packaged boilers require a much higher quality feed water 80F than is the case with feedwater 12F for a once-through type steam generator. As a result, in one embodiment, the novel process disclosed herein includes an evaporation unit 140 based approach to packaged boiler 80 feedwater 80F pretreatment (i.e., pretreatment of the de-oiled produced water 46 generated following the de-oiling process 40 in line after the oil/water separation process 32) has now been developed as a novel, improved method for produced water treatment in heavy oil production.

An oil/water mixture 22 is pumped up through oil gathering wells 30 and this mixture is sent to a series of oil/water separators 32. An oil product 34 is gathered for further conditioning, transport, and sale. The produced water 36 which has been separated from the oil/water mixture 22 is then sent to a produced water de-oiling step 40, which may be accomplished in dissolved air flotation units with the assistance of the addition of a de-oiling polymer 42, or by other appropriate unit processes.

Figure 5:
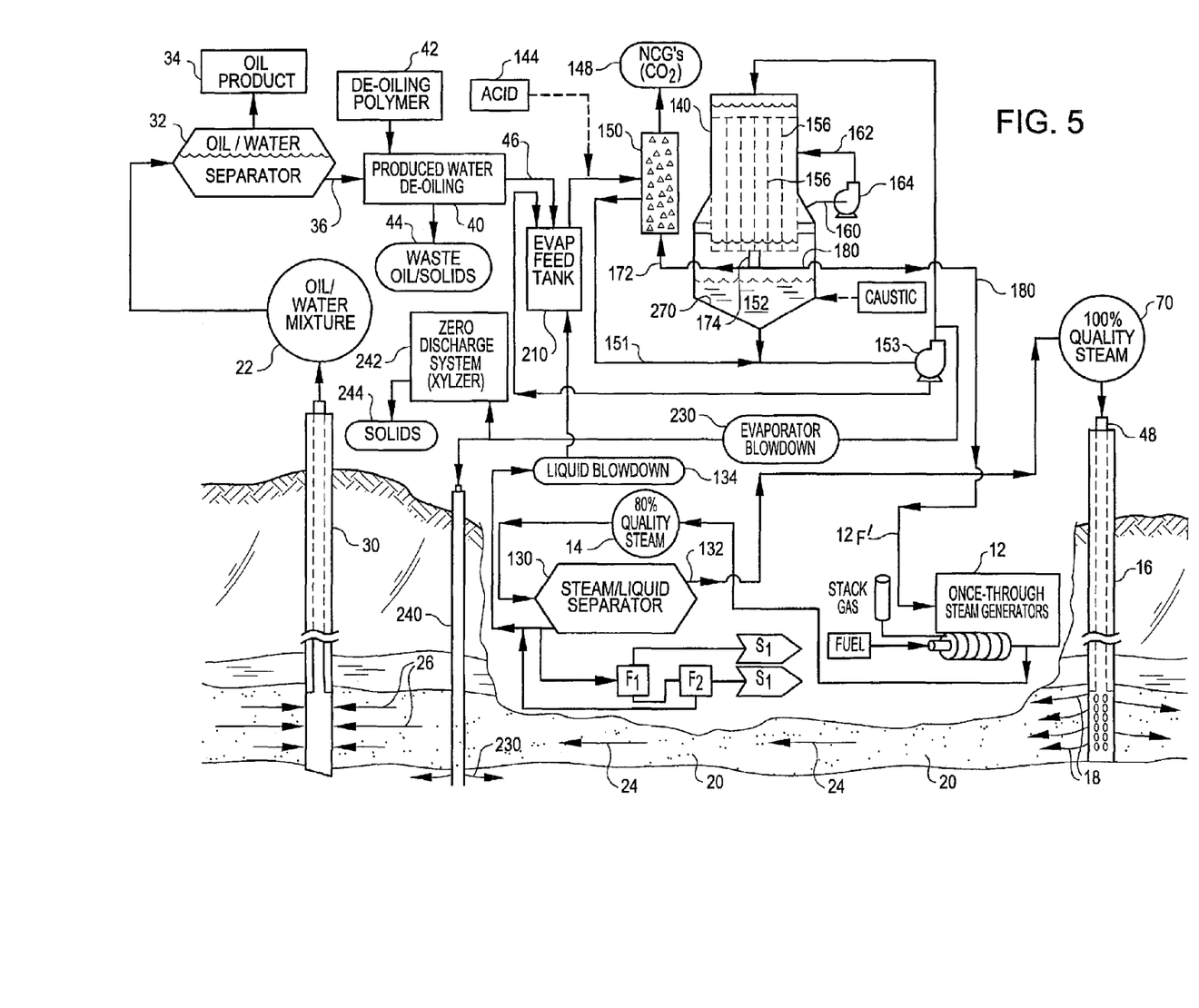
FIG. 5 shows another embodiment of the novel water treatment process disclosed and claimed herein, illustrating the use of the process in combination with the use of once-through steam generators for steam production, as applied to heavy oil recovery operations, which process is characterized by feed of evaporator distillate to once-through steam generators without the necessity of further pretreatment.
Figure 8:
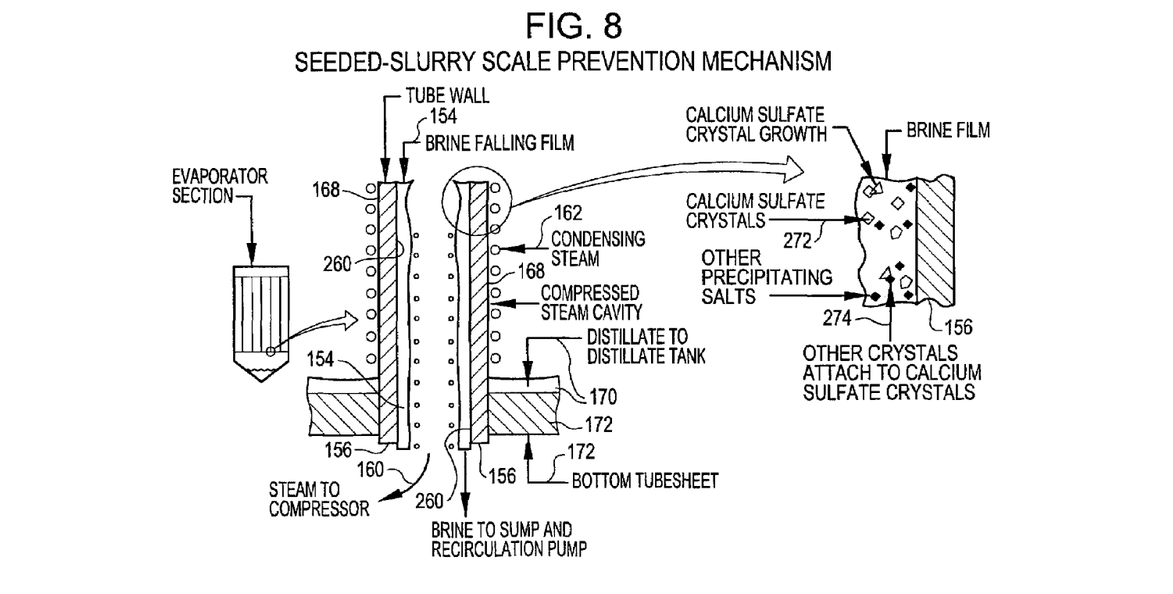
FIG. 8 diagrammatically illustrates a seeded-slurry scale prevention mechanism useful in the evaporation of waters containing calcium sulfate and silica, as well as the condensation of an evaporated steam distillate at a heat exchange tube, and the downward flow of such condensate by gravity for the collection of such condensate above the bottom tubesheet of an evaporator.

In the water treatment method disclosed herein, the de-oiled produced water 46 is treated and conditioned for feed to a mechanical vapor recompression evaporator unit 140 to concentrate the incoming produced water stream 46. The necessary treatment and conditioning prior to the evaporator unit 140 can usually be efficiently accomplished by addition when necessary and or appropriate of acid 144, such as sulfuric acid or hydrochloric acid, to lower the pH sufficiently so that bound carbonates are converted to free gaseous carbon dioxide, which is removed, along with other non-condensable gases 148 dissolved in the feedwater 46 such as oxygen and nitrogen, in an evaporator feedwater deaerator 150. The conditioned feedwater 151 is sent as feed to evaporator 140. Concentrated brine 152 in the evaporator 140 is recirculated via pump 153, so only a small portion of the recirculating concentrated brine is removed on any one pass through the evaporator 140. In the evaporator 140, the solutes in the feedwater 46 are concentrated via removal of water from the feedwater 46. As depicted in FIG. 8, evaporator 140 is in one embodiment provided in a falling film configuration wherein a thin brine film 154 falls inside of a heat transfer tube 156. A small portion of the water in the thin brine film 154 is extracted in the form of steam 160, via heat given up from heated, compressed steam 162 which is condensing on the outside of heat transfer tubes 156. Thus, the water is removed in the form of steam 160, and that steam is compressed through the compressor 164, and the compressed steam 162 is condensed at a heat exchange tube 156 in order to produce yet more steam 160 to continue the evaporation process. The condensing steam on the outer wall 168 of heat transfer tubes 156, which those of ordinary skill in the evaporation arts and to which this disclosure is directed may variously refer to as either condensate or distillate 170, is in relatively pure form, low in total dissolved solids. In one embodiment, such distillate contains less than 10 parts per million of total dissolved solids of non-volatile components. Since, as depicted in FIGS. 4 and 5, only a single stage of evaporation is provided, such distillate 170 may be considered to have been boiled, or distilled, once, and thus condensed but once. Also, the falling film evaporator 140 design is provided only for purposes of enabling the reader to understand the water treatment process, and is not intended to limit the process to the use of same, as those in the art will recognized that other designs, such as, for example, a forced circulation evaporator, or a rising film evaporator, may be alternately utilized with the accompanying benefits and/or drawbacks as inherent in such alternative evaporator designs.

In any event, the distillate 170 descends by gravity along tubes 156 and accumulates above bottom tube sheet 172, from where it is collected via condensate line 174. A small portion of such distillate 170 may be sent via line 173 to the earlier discussed deaerator 150 for use in mass transfer, i.e., heating descending liquids in a packed tower to remove non-condensable gases 148 such as carbon dioxide. However, the bulk of the distillate is removed as a liquid in line 180, and may be sent for further treatment to ultimately produce a feedwater 8OF', in the case where packaged boilers 80 are utilized as depicted in FIG. 4. Alternately, in the embodiment set forth in FIG. 5, distillate 180 may be sent directly to once-through steam generators as feedwater 12F' (as distinguished by vastly higher quality from feedwater 12F discussed hereinabove with respect to prior art processes) for generation of 80% quality steam 14.

Before feed to the boilers, it may, in some embodiments, be necessary to remove the residual organics and other residual dissolved solids from the distillate 180. For example, as seen in FIG. 4, in some cases, it may be necessary to remove residual ions from the relatively pure distillate 180 produced by the evaporator 140. In most cases the residual dissolved solids in the distillate involve salts other than hardness. In one embodiment, removal of residual dissolved solids can be accomplished by passing the evaporator distillate 180, after heat exchanger 200, through an ion exchange system 202. Such ion-exchange systems may be of mixed bed type and directed to remove the salts of concern in a particular water being treated. In any event, regenerant chemicals 204 will ultimately be required, and regeneration results in a regeneration waste 206 that must be further treated. Fortunately, in the process scheme depicted, the regeneration waste 206 can be sent back to the evaporator feed tank 210 for a further cycle of treatment through the evaporator 140. In another embodiment, removal of residual dissolved solids can be accomplished by passing the evaporator distillate 180 through a heat exchanger 200' and then through electrodeionization (EDI) system 220. The EDI reject 222 is also capable of being recycled to evaporator feed tank 210 for a further cycle of treatment through the evaporator 140.

The just described novel combination of process treatment steps produces feedwater of sufficient quality, and in economic quantity, for use in packaged boilers 80 in heavy oil recovery operations. Advantageously, when provided as depicted in FIG. 4 a single liquid waste stream is generated, namely evaporator blowdown 230, which contains the concentrated solutes originally present in feedwater 46, along with additional contaminants from chemical additives (such as caustic 232, when utilized to elevate the pH of recirculating brine 152, or regeneration chemicals 204). Also, even the evaporator blowdown 230 can be disposed in an environmentally acceptable manner, which, depending upon locale, might involve injection in deep wells 240, or alternately, evaporation to complete dryness in a zero discharge system 242, such as a crystallizer or drum dryer, to produce dry solids 244 for disposal.

The new process method, as variously set forth in FIGS. 4 and 5, is useful in heavy oil production since it (1) eliminates many physical-chemical treatment steps commonly utilized previously in handing produced water, (2) results in lower capital equipment costs, (3) results in lower operating costs for steam generation, (4) eliminates the production of softener sludge, thus eliminating the need for the disposal of the same, (5) eliminates other waste streams, thus minimizing the number of waste streams requiring disposal, (6) minimizes the materiel and labor required for maintenance, and (7) reduces the size of water de-oiling equipment in most operations.

In the process disclosed herein, the evaporator 140 is designed to produce high quality distillate (typically 2–5 ppm non-volatile TDS) which, after temperature adjustment to acceptable levels in heat exchangers 200 or 200' (typically by cooling to about 45° C., or lower) can be fed directly into polishing equipment (EDI system 220 or ion exchange system 202) for final removal of dissolved solids. The water product produced by the polish equipment just mentioned is most advantageously used as feedwater for the packaged boiler 80. That is because in the typical once-though steam generator 12 used in oil field operations, it is normally unnecessary to incur the additional expense of final polishing by removal of residual total dissolved solids from the evaporator distillate stream 180. This can be further understood by reference to FIG. 6A, where a typical boiler feed water chemistry specification is presented for packaged boilers, and FIG. 6B, for once-through steam generators. It may be appropriate in some embodiments from a heat balance standpoint that the de-oiled produced waters 46 fed to the evaporator for treatment be heated by heat exchange with the distillate stream 180. However, if the distillate stream is sent directly to once-through steam generators 12, then no cooling of the distillate stream 180 may be appropriate. Also, in the case of once-through steam generators 12, it may be necessary or appropriate to utilize a plurality of flash tanks $F_1$, etc., in the manner described above with reference to FIG. 2.

Also, as briefly noted above, but significantly bears repeating, in those cases where the EDI system 220 is utilized for polishing, the EDI reject stream 222 is recycled to be mixed with the de-oiled produced water 46 in the evaporator feed tank 210 system, for reprocessing through the evaporator 140.

Again, it should be emphasized that the blowdown 230 from the evaporator 140 is often suitable for disposal by deep well 240 injection. Alternately, the blowdown stream can be further concentrated and/or crystallized using a crystallizing evaporator, or a crystallizer, in order to provide a zero liquid discharge 242 type operation. This is an important advantage, since zero liquid discharge operations may be required if the geological formation is too tight to allow water disposal by deep well injection, or if regulatory requirements do not permit deep well injection.

Operating Modes for Evaporation

Figure 7:
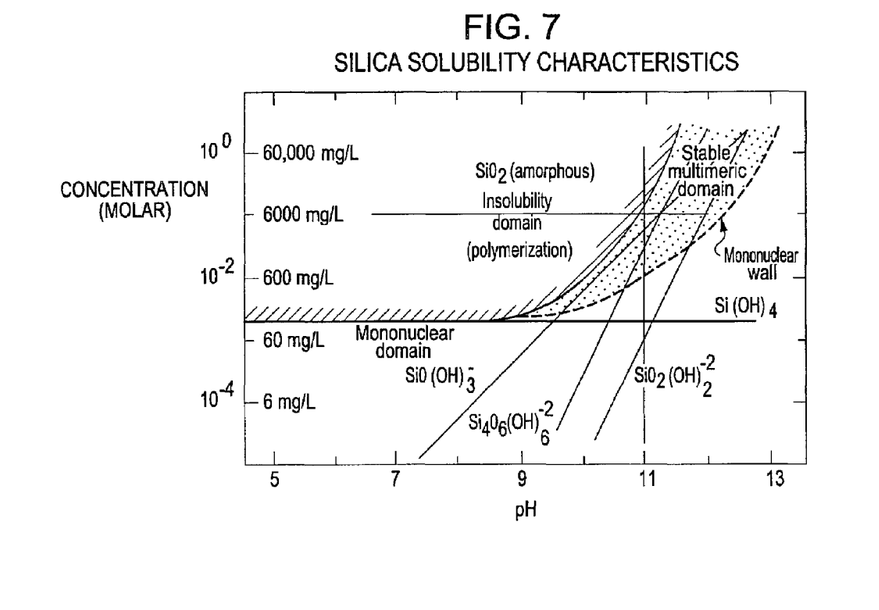
FIG. 7 illustrates the solubility of silica in water as a function of pH at 25° C. when such silica species are in equilibrium with amorphous silica, as well as the nature of such soluble silica species (molecule or ion) at various concentration and pH ranges.

Most produced waters encountered in heavy oil production are high in silica, with typical values ranging up to about 200 mg/l as SiO2, or higher. In order to minimize the capital cost of an evaporator, and particularly, a mechanical vapor recompression (MVR) evaporation system 140, and while simultaneously providing a process design which prevents the scaling of the inner surfaces 260 of the heat transfer tubes 156 with the ever-present silica, operation of the evaporator 140 at high pH, i.e., in preferably excess of about 10.5 is undertaken. More preferably, operation in the range from about 11 to about 12, or higher in appropriate cases, can be used to keep the silica in aqueous solution. This is important, since silica solubility must be accounted for in the design and operation of the evaporator 140, in order to prevent silica scaling of the heat transfer surfaces 260. The solubility characteristics of silica are shown in FIG. 7. Since the high pH operation assures increased silica solubility, a concentration factor (i.e. ratio of feed rate 151 to blowdown rate 230) for the evaporator 140 can be selected so that silica solubility is not exceeded. Operation at high pH also allows the use of low cost heat transfer tubes 156 and other brine wetted surfaces such as sump walls 270, thus minimizing the capital cost of the system.

Since the calcium hardness and sulfate concentrations of many produced waters is low (typically 20–50 ppm Ca as CaCO3), in many cases it is also possible to operate the evaporators 140 below the solubility limit of calcium sulfate, with proper attention to feedwater quality and to pre-treatment processes. However, if the produced water contains an appreciable amount of calcium and sulfate, the mechanical vapor recompression evaporator 140 can also be operated using a calcium sulfate seeded-slurry technique, even at the high pH of operation. That mode of operation can be made possible by the substantial elimination of carbonate alkalinity before the feedwater is introduced into the evaporator 140. To allow the evaporator to be constructed with low cost materials of construction, the pH can be controlled between about 11 and about 12, while operating the evaporator 140 in the seeded-slurry mode.

Operation of the MVR Evaporator in the Seeded-Slurry Mode

Prior to the initial startup of the MVR evaporator in the seeded-slurry mode, the evaporator, which in such mode is provided in a falling-film, mechanical vapor recompression configuration, the fluid contents of the unit are "seeded" by the addition of calcium sulfate (gypsum). The circulating solids within the brine slurry serve as nucleation sites for subsequent precipitation of calcium sulfate 272, as well as silica 274. Such substances both are precipitated as an entering feedwater is concentrated. Importantly, the continued concentrating process produces additional quantities of the precipitated species, and thus creates a continuing source of new "seed" material as these particles are broken up by the mechanical agitation, particularly by the action of the recirculation pump 153.

In order to avoid silica and calcium sulfate scale buildup in the evaporator 140, calcium sulfate seed crystals 272 are continuously circulated over the wetted surfaces, i.e., the falling film evaporator tubes 156, as well as other wetted surfaces in the evaporator 140. Through control of slurry concentration, seed characteristics, and system geometry, the evaporator can operate in the otherwise scale forming environment. The thermochemical operation within the evaporator 140 with regard to the scale prevention mechanism is depicted in FIG. 7. As the water is evaporated from the brine film 154 inside the tubes 156, the remaining brine film becomes super saturated and calcium sulfate and silica start to precipitate. The precipitating material promotes crystal growth in the slurry rather than new nucleation that would deposit on the heat transfer surfaces; the silica crystals attach themselves to the calcium sulfate crystals. This scale prevention mechanism, called preferential precipitation, has a proven capability to promote clean heat transfer surfaces 260. The details of one advantageous method for maintaining adequate seed crystals in preferentially precipitation systems is set forth in U.S. Pat. No. 4,618,429, issued Oct. 21, 1986 to Howard R. Herrigel, the disclosure of which is incorporated into this application in full by this reference.

It is to be appreciated that the water treatment process described herein for preparing boiler feedwater in heavy oil recovery operations is an appreciable improvement in the state of the art of water treatment for oil recovery operations. The process eliminates numerous of the heretofore encountered waste streams, while processing water in reliable mechanical evaporators, and in one embodiment, in mechanical vapor recompression ("MVR") evaporators. Polishing, if necessary, can be accomplished in ion exchange and electrodeionization equipment. The process thus improves on currently used treatment methods by eliminating most treatment or regeneration chemicals, eliminating many waste streams, eliminating some types of equipment. Thus, the complexity associated with a high number of treatment steps involving different unit operations is avoided.

In the improved water treatment method, the control over waste streams is focused on a the evaporator blowdown, which can be conveniently treated by deep well 240 injection, or in a zero discharge system 242 such as a crystallizer and/or spray dryer, to reduce all remaining liquids to dryness and producing a dry solid 244. This contrasts sharply with the prior art processes, in which sludge from a lime softener is generated, and in which waste solids are gathered at a filter unit, and in which liquid wastes are generated at an ion exchange system and in the steam generators. Moreover, this waste water treatment process also reduces the chemical handling requirements associated with water treatment operations.

Although only several exemplary embodiments of this invention have been described in detail, it will be readily apparent to those skilled in the art that the novel produced waste treatment process, and the apparatus for implementing the process, may be modified from the exact embodiments provided herein, without materially departing from the novel teachings and advantages provided by this invention, and may be embodied in other specific forms without departing from the spirit or essential characteristics thereof. Therefore, the disclosures presented herein are to be considered in all respects as illustrative and not restrictive. It will thus be seen that the objects set forth above, including those made apparent from the preceding description, are efficiently attained. Many other embodiments are also feasible to attain advantageous results utilizing the principles disclosed herein. Therefore, it will be understood that the foregoing description of representative embodiments of the invention have been presented only for purposes of illustration and for providing an understanding of the invention, and it is not intended to be exhaustive or restrictive, or to limit the invention only to the precise forms disclosed.

All of the features disclosed in this specification (including any accompanying claims, and the drawing) may be combined in any combination, except combinations where at least some of the features are mutually exclusive. Alternative features serving the same or similar purpose may replace each feature disclosed in this specification (including any accompanying claims, and the drawing), unless expressly stated otherwise. Thus, each feature disclosed is only one example of a generic series of equivalent or similar features. Further, while certain process steps are described for the purpose of enabling the reader to make and use certain water treatment processes shown, such suggestions shall not serve in any way to limit the claims to the exact variation disclosed, and it is to be understood that other variations, including various treatment additives or alkalinity removal techniques, may be utilized in the practice of my method. The intention is to cover all modifications, equivalents, and alternatives falling within the scope and spirit of the invention, as expressed herein above and in any appended claims. The scope of the invention, as described herein and as indicated by any appended claims, is thus intended to include variations from the embodiments provided which are nevertheless described by the broad meaning and range properly afforded to the language of the claims, as explained by and in light of the terms included herein, or the legal equivalents thereof.

The invention claimed is:

1. A method of producing steam for downhole injection in the recovery of heavy oil, said method comprising:
   (a) providing an oil/water mixture gathered from an oil/water collection well,
   (b) substantially separating oil from said oil/water mixture to provide an oil product and an oil containing produced water;
   (c) de-oiling said oil containing produced water to at least partially provide an evaporator feedwater, said evaporator feedwater comprising water, dissolved solutes, and dissolved gases, said dissolved solutes comprising silica
   (d) heating said evaporator feedwater to remove at least some of said dissolved gases;
   (e) injecting said evaporator feedwater into an evaporator, and concentrating said evaporator feedwater to produce a concentrated heated brine, said evaporator having a plurality of heat transfer surfaces;
   (f) maintaining the pH of said concentrated heated brine as necessary to maintain solubility of silica therein at a selected concentration factor;
   (g) distributing said brine on a first surface of at least one of said plurality of heat transfer surfaces to generate a steam vapor;
   (h) discharging at least some of said brine as an evaporator blowdown stream;
   (i) slightly compressing said steam vapor to produce a compressed steam vapor;
   (j) directing said compressed steam vapor to a second surface of at least one of said plurality of heat transfer surfaces to condense said compressed steam vapor and to form a distillate;
   (k) collecting said distillate;
   (l) introducing said distillate into a boiler, to produce
      (i) steam,
      (ii) a boiler blowdown stream, said boiler blowdown stream comprising water and residual dissolved solids.
      (iii) adding said boiler blowdown stream to said evaporator feedwater prior to the step of heating said evaporator feedwater;
   (m) injecting said steam in injection wells to fluidize oil present in a selected geological formation, to produce an oil and water mixture for collection at a production well;
   (n) gathering said oil and water mixture.

2. The method as set forth in claim 1, wherein said evaporator feedwater further comprises at least some non-hydroxide alkalinity, further comprising prior to heating said evaporator feedwater, lowering the pH of said evaporator feedwater by the addition of acid thereto, so as to produce at least some free carbon dioxide, in order to remove at least some non-hydroxide alkalinity from said evaporator feedwater.

3. The method as set forth in claim 1, further comprising cooling said evaporator distillate prior to feeding of said distillate to a boiler.

4. The method as set forth in claim 3, further comprising removing at least some residual solutes from said distillate to produce a substantially solute free boiler feedwater stream.

5. The method as set forth in claim 4, wherein said method further comprises heating said substantially solute free treated boiler feedwater stream before introducing said stream into said boiler.

6. The process as set forth in claim 1, wherein during concentrating said evaporator feedwater, the pH of said concentrated heated brine circulating in said evaporator is maintained to at least 10.5.

7. The process as set forth in claim 1, wherein during concentrating said evaporator feedwater, the pH of said concentrated heated brine circulating in said evaporator is maintained to between about 11 and about 12.

8. The process as set forth in claim 1, wherein during concentrating said evaporator feedwater, the pH of said concentrated heated brine circulating in said evaporator is maintained to 12 or above.

9. The process as set forth in claim 1, or in claim 4, wherein said evaporator feedwater further comprises calcium, and wherein a seeded-slurry is maintained for preferential precipitation of said calcium to said seeds rather than to said heat transfer surfaces of said evaporator.

10. The process as set forth in claim 6, or in claim 7, wherein pH is maintained by the addition of sodium hydroxide.

11. The process as set forth in claim 2, wherein lowering the pH of said evaporator feedwater is accomplished by addition of sulfuric acid or hydrochloric acid.

12. The process as set forth in claim 1, wherein said evaporator is a falling-film type evaporator.

13. The process as set forth in claim 1, wherein said evaporator is a forced-circulation type evaporator.

14. The process as set forth in claim 12 or in claim 13, wherein said heat transfer surfaces are tubular.

15. The process as set forth in claim 14, wherein said evaporator feedwater is concentrated in the interior of said tubular heat transfer surfaces.

16. The process as set forth in claim 12 or in claim 13, wherein said evaporator comprises a mechanical vapor recompression evaporator.

17. The process as set forth in claim 1, further comprising returning said boiler blowdown stream to said evaporator feedwater.

18. The process as set forth in claim 1, wherein said distillate comprises water and residual solutes. further comprising removing said residual solutes from said distillate in an electrodeionization treatment unit to produce (a) a substantially solute free distillate for feed to said boiler, and (2) a solute containing reject stream.

19. The process as set forth in claim 18, further comprising returning said electrodeionization reject stream to said evaporator feedwater stream for treatment in said evaporator.

20. The process as set forth in claim 1, further comprising the step of injecting said evaporator blowdown stream in a deep-well.

21. The process as set forth in claim 1, further comprising the step of treating said evaporator blowdown stream in a crystallizer.

22. The process as set forth in claim 1, further comprising the step of treating said evaporator blowdown stream in a spray dryer, to produce dry solids from said evaporator blowdown stream.

23. The process as set forth in claim 1, further comprising, before heating said evaporator feedwater, removing oil from said evaporator feedwater stream to a selected concentration.

24. The process as set forth in claim 23, wherein the selected concentration of oil in said evaporator feedwater comprises less than about twenty parts per million.

25. The process as set forth in claim 24, further comprising removing residual solutes in said evaporator distillate in an ion exchange resin.

26. The process as set forth in claim 25, further comprising the step of regenerating said ion exchange resin to generate an ion exchange regenerant stream, and still further comprising returning said ion exchange regenerant stream to said evaporator feedwater to treat said ion exchange regenerant stream in said evaporator.

27. The process as set forth in claim 1, wherein said boiler comprises a packaged boiler.

28. The process as set forth in claim 1, wherein said boiler comprises a once-through steam generator which produces about 80% quality steam.

29. The process as set forth in claim 28, further comprising, after said once through steam generator, separating steam and liquid from said about 80% quality steam, to produce a steam stream having substantially 100% quality.

30. The process as set forth in claim 29, wherein said 100% steam quality stream is injected in said injection wells.

31. The process as set forth in claim 29, wherein said step of separating said about 80% steam comprises producing a liquid stream containing dissolved solutes, and wherein said liquid stream is flashed to produce a still further concentrated liquid containing dissolved solutes.

32. The process as set forth in claim 31, further comprising adding said still further concentrated liquid containing dissolved solutes from flashing to said evaporator feedwater.

* * * * *